Figure 1:
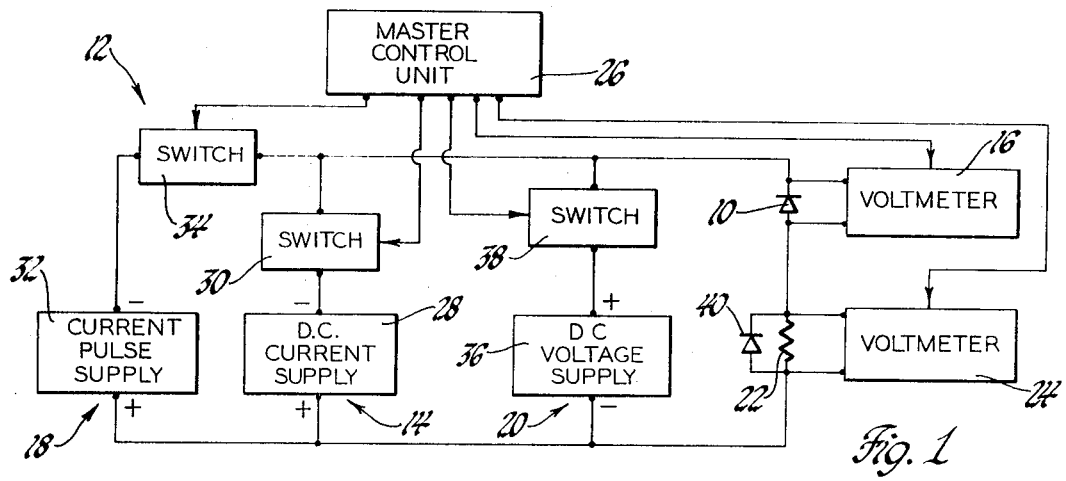

United States Patent
Knutson

[15] 3,659,199
[45] Apr. 25, 1972

[54] RECTIFIER TEST METHOD

[72] Inventor: Charles J. Knutson, Burlington, Ind.
[73] Assignee: General Motors Corporation, Detroit, Mich.
[22] Filed: Mar. 7, 1969
[21] Appl. No.: 805,277

[52] U.S. Cl. .......................................................324/158 D
[51] Int. Cl.......................................................G01r 31/26
[58] Field of Search ............................324/158, 158 D, 158 T

[56] References Cited

UNITED STATES PATENTS

| | | | |
|---|---|---|---|
| 3,521,167 | 7/1970 | Umemori et al. ........................ | 324/158 |
| 3,235,803 | 2/1966 | Imai et al. ............................... | 324/158 |
| 3,253,221 | 5/1966 | Peckover ................................ | 324/158 |

OTHER PUBLICATIONS

Wang et al.; Maximum Pulse-Current Ratings....; SCP and Solid State Technology; Vol. 7; No. 1; January 1964; pages 20-25

Reich et al.; an Appraisal of ....; SCP and Solid State Technology; April 1965; pages 21, 22, 27, 28, 29

*Primary Examiner*—Rudolph V. Rolinec
*Assistant Examiner*—Ernest F. Karlsen
*Attorney*—Jean L. Carpenter and Paul Fitzpatrick

[57] ABSTRACT

A method for measuring characteristics of semiconductor devices having a junction. This method includes the steps of heating a junction of a semiconductor device by supplying the device with a predetermined current for a predetermined time, supplying the device with a reverse bias voltage, and measuring the voltage across and current through the device at certain times during the test. Testing by this method yields indications as to the temperature the junction in the semiconductor device will reach during operation, the quality of the mechanical connections to the junction, the junction forward voltage characteristic slope, and the likelihood of the device undergoing thermal runaway.

10 Claims, 3 Drawing Figures

PATENTED APR 25 1972

3,659,199

INVENTOR.
Charles J. Knutson
BY
Hugh L. Fisher
ATTORNEY

RECTIFIER TEST METHOD

This invention relates to the testing of semiconductor devices and in particular to determining electrical characteristics of semiconductor devices having a junction.

While this invention may be used to obtain characteristics of devices having more than one junction, such as transistors, it has been found to be particularly useful in the testing of rectifiers. Accordingly, this disclosure will be directed toward a method for testing rectifiers, but it is to be understood that the term "rectifier" for purposes of this discussion includes all semiconductor devices employing a junction to be tested having the characteristics of a low resistance to current in a first, or forward, direction and a high resistance to current in the opposite, or reverse, direction.

The characteristics which determine the operation of a rectifier are important to the design engineer who must specify the characteristics needed by rectifiers in a particular circuit. Such knowledge also serves the rectifier manufacturer by permitting him to classify rectifiers according to their characteristics, since a rectifier that may be unsuitable for use in a particular application may be suitable for use in a different application.

It is therefore an object of this invention to provide a method of testing rectifiers including the steps of heating the rectifier junction by supplying the rectifier with a predetermined current for a predetermined time and measuring the change in operating characteristics of the rectifier caused by heating the rectifier junction.

It is also an object of this invention to provide a method for obtaining an indication of the operating temperature of a rectifier junction by measuring the change in operating characteristics of the junction due to heating the rectifier junction from room temperature to an increased temperature by supplying the rectifier with a predetermined current for a predetermined time.

An additional object of this invention is to provide a method for obtaining an indication of the construction quality of a rectifier, the construction quality being a function of the rectifier's internal resistance, by measuring the change in operating characteristics of the rectifier due to heating the rectifier junction by supplying the rectifier with a predetermined current for a predetermined time.

It is a more specific object of this invention to provide a method for obtaining the slope of a rectifier forward voltage characteristic by measuring the rectifier forward voltage at widely spaced current levels without changing the rectifier junction temperature.

Another object of this invention is to provide a method for obtaining an indication of the likelihood that a rectifier will undergo thermal runaway at high temperatures by measuring reverse leakage current through the rectifier after the rectifier junction has been heated by supplying the rectifier with a predetermined current for a predetermined time.

Figure 2:
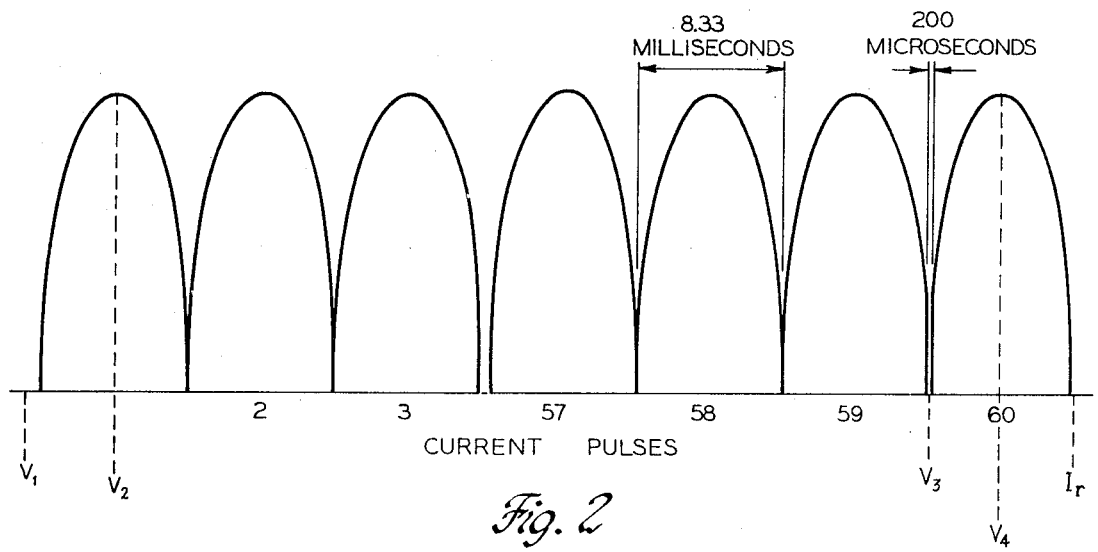
Figure 3:
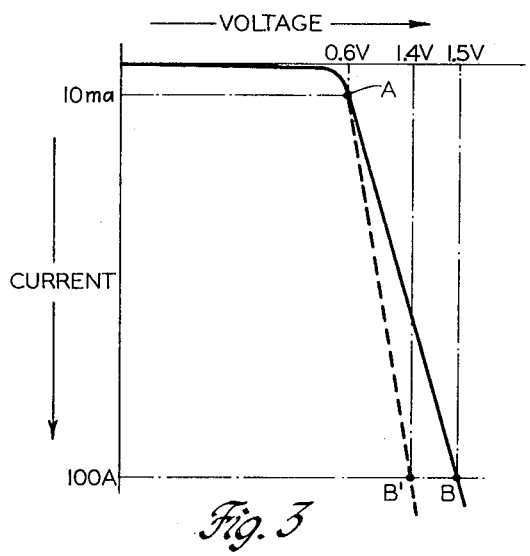

The foregoing and other objects and advantages of this invention will be more readily understood from the following description and figures, in which:

FIG. 1 is a schematic diagram of test apparatus which may be used in practicing the method, FIG. 2 illustrates a current wave form used to introduce electric energy to a rectifier under test, and FIG. 3 illustrates a typical forward voltage characteristic of a rectifier.

Referring now to the drawings, and initially to FIG. 1, there is shown a rectifier 10, the characteristics of which are to be determined by a circuit 12. While the subject method may be used to determine the characteristics of any rectifier, this discussion will be directed toward testing 1N3491 rectifier rectifiers manufactured by the Delco Radio Division of General Motors Corporation. The subject method of testing 1N3491 rectifiers includes the steps of heating the rectifier 10 junction by supplying the rectifier 10 with a predetermined current for a predetermined time so as to increase the rectifier 10 junction temperature from room temperature to an increased temperature, measuring the voltage across the rectifier 10 at diverse times before and after the heating of the rectifier 10 junction so as to provide indications of the rectifier 10 operating characteristics at low and high current levels when the rectifier 10 junction is at room temperature and the increased temperature, comparing the various measured voltages for determining additional indications of the rectifier 10 operating characteristics, supplying the rectifier 10 with a reverse bias voltage when the rectifier 10 junction is at the increased temperature, and measuring the rectifier 10 reverse leakage current due to the reverse bias voltage so as to provide another indication of the rectifier 10 operating characteristics.

The circuit 12 is comprised of a D.C. supply network 14 for passing a small D.C. current through the rectifier 10 to facilitate measuring the forward voltage across the rectifier 10, a voltmeter 16 for measuring the rectifier 10 forward voltage, a current pulse network 18 for heating the rectifier 10 junction by supplying the rectifier 10 with a predetermined current for a predetermined time, a voltage pulse network 20 for applying a reverse bias voltage to the rectifier 10, a resistor 22 and a voltmeter 24 for measuring reverse leakage current passing through the rectifier 10, and a master control unit (MCU) 26 for automatically controlling the operation of the networks 14, 18, and 20 and the voltmeters 16 and 24.

The D.C. supply network 14 includes a constant current D.C. supply 28, such as a model C612 manufactured by the Electronic Measurements Company, and a switch 30 of a conventional design that is opened and closed in accordance with trigger signals from the MCU 26. When the switch 30 is closed the supply 28 passes a D.C. current through the rectifier 10. The D.C. current selected is the smallest current that will cause the rectifier 10 to conduct as its function is merely to produce a measurable forward voltage across the rectifier 10 while keeping internal heating in the rectifier 10 to a minimum. A current of this magnitude may be approximately 10 milliamps for a 1N3491 rectifier and is illustrated as point A in FIG. 3, which illustrates the rectifier 10 forward voltage characteristic.

The forward voltage across the rectifier 10 is measured by the voltmeter 16 at various times while practicing the method so as to provide several indications of the rectifier 10 operating characteristics. The voltmeter 16 is of a conventional design operative to sample a voltage each time it receives a trigger signal and to hold the measured voltage in storage. An additional function of the voltmeter 16 is to perform certain subtractions using the voltages it measures for purposes that will be explained later. A suitable voltmeter for use as the voltmeter 16 is one comprised of Philbrick/Nexus amplifiers in circuits described in a pamphlet entitled "Applications Manual for Operational Amplifiers for Modeling, Measuring, Manipulating, and Much Else" published by Philbrick/Nexus. In practice, for economic reasons, the voltmeters 16 and 24 may readily be consolidated into one unit with appropriate control switches, as persons skilled in the art will appreciate. The voltages measured by the voltmeter 16 are continuously indicated by a plurality of indicator devices (not shown) until the voltmeter 16 is reset by a trigger signal that differs from the trigger signal that causes it to sample a voltage. The trigger signals which control the voltmeter 16 are produced by the MCU 26.

The current pulse network 18 includes a current pulse supply 32 and a switch 34 responsive to trigger signals from the MCU 26. When the switch 34 is closed the pulse supply 32 passes a predetermined current through the rectifier 10 for a predetermined time so as to heat the rectifier 10 junction and thereby effect a measureable change in the rectifier 10 operating characteristics. While the pulse supply 32 shown in the illustrated embodiment is comprised of a transformer powered by commercial power lines (not shown) so as to produce the waveform shown in FIG. 2, persons skilled in the art will appreciate that constant current pulse supplies producing other waveforms may be used as the pulse supply 32, such as a constant D.C. current supply. Since the primary function of the pulse supply 32 is to provide a predetermined current for a predetermined time to the rectifier 10 so as to heat the rectifier 10 junction and thus change the rectifier 10 operating characteristics, the current pulse amplitude is selected so as to produce a buildup of heat energy at the rectifier 10 junction. A suitable amplitude of the current pulses illustrated in FIG. 2 for testing a 1N3491 rectifier in accordance with this method is 100 amps and is indicated as point B on the forward voltage characteristic curve in FIG. 3.

The D.C. voltage pulse network 20 includes a D.C. voltage supply 36 and a switch 38 operative in accordance with trigger signals from the MCU 26. It has been found that a 50 volt Zener diode driven by a constant current supply, such as the C612 used as the D.C. supply 28, makes a suitable D.C. voltage supply for use as the D.C. voltage supply 36. It is the function of the D.C. voltage supply 36 to supply the rectifier 10 with a reverse bias voltage when the switch 38 is closed after the rectifier 10 junction has been heated from room temperature to an increased temperature, so as to cause a reverse leakage current through the rectifier 10. The magnitude of this reverse leakage current may be used to predict whether the rectifier 10 will undergo thermal runaway.

The reverse leakage current through the rectifier 10 is measured in the illustrated embodiment by connecting the resistor 22 in series with the rectifier 10 and measuring the voltage across the resistor 22 with the voltmeter 24. The resistor 22 is selected to have a low value of known resistance so as to have virtually no effect on the circuit 12. To assure that the resistor 22 does not affect the circuit 12 except when measuring the rectifier 10 reverse leakage current, the resistor 22 may be bypassed by a battery of diodes 40. For example, a battery of a hundred 1N2070 diodes may be placed in parallel with the resistor as illustrated in FIG. 1, so as to cause the currents from the current supplies 28 and 32 to bypass the resistor 22 and thereby prevent excessive power losses in the resistor 22.

Since the reverse leakage current through the resistor 22 is directly proportional to the voltage across the resistor 22, the voltmeter 24 may be calibrated to indicate directly the current through the resistor 22. As was previously explained, the voltmeter 24 is similar to the voltmeter 16 as it is designed to sample a voltage in response to a trigger signal from the MCU 26 and to store the sampled voltage until it is reset by a different trigger signal from the MCU 26.

The operation of the circuit 12 is under the automatic control of the MCU 26. A satisfactory MCU 26 may be built from Delcon "CD" Logic, manufactured by the Delco Radio Division of General Motors Corporation, as described in "Engineering Data," an industrial control handbook published by Delco Radio Division.

The MCU 26 controls the circuit 12 sequence of operation by providing trigger signals to the switches 30, 34, and 38 and to the voltmeters 16 and 24. As persons skilled in the art will appreciate, the MCU 26 is designed to control these units by applying two distinct signals to each unit. For example, the switches 30, 34, and 38 may be designed to become conductive in response to a trigger signal having a positive slope (hereafter termed a positive pulse) and nonconductive in response to a trigger signal having a negative slope (hereafter termed a negative pulse). Similarly, the voltmeters 16 and 24 may be designed to sample the voltages across their respective terminals in response to a positive pulse and to be reset in response to a negative pulse, the resetting causing the measurements stored in them to be erased.

The operation of the circuit 12 will now be explained. After inserting the rectifier 10 in the circuit 12, the MCU 26 is turned on so as to begin automatic testing of the rectifier 10. While the rectifier 10 is at room temperature the MCU 26 applies a positive pulse to the switch 30, closing the switch 30 so as to pass a D.C. current from the D.C. supply 28 through the rectifier 10, the current causing a voltage across the rectifier 10. The MCU 26 then applies a positive pulse to the voltmeter 16, causing it to measure the forward voltage across the rectifier 10 so as to provide an indication of the rectifier 10 operating characteristics at a low current level when the rectifier 10 junction is at room temperature. This voltage is designated as $V_1$ and is held in storage by the voltmeter 16. $V_1$ is measured at the time indicated in FIG. 2.

After the voltmeter 16 has measured $V_1$ the switch 30 remains closed and the MCU 26 applies a positive pulse to the switch 34, closing the switch 34 so as to produce heating of the rectifier 10 junction by supplying current pulses to the rectifier 10 from the pulse supply 32. When the first current pulse from the pulse supply 32 is at a maximum the MCU 26 applies a positive pulse to the voltmeter 16, causing it to again sample and record the forward voltage across the rectifier 10. This voltage, $V_2$, is indicative of the rectifier 10 operating characteristics at a high current level when the rectifier 10 junction is at room temperature. The voltage, $V_2$, is recorded as indicated in FIG. 2. As will be subsequently explained, the difference between $V_1$ and $V_2$ can be used to indicate the slope of the forward voltage characteristic curve in FIG. 3.

After a predetermined time of heating the rectifier 10 junction with current pulses from the pulse supply 32 has elapsed, 59 pulses in the illustrated embodiment, the MCU 26 applies a negative pulse and then a positive pulse to the switch 34. These pulses open and close the switch 34 so as to open the circuit from the pulse supply 32 to the rectifier 10 for a brief interrupt period, which lasts for approximately 200 microseconds in the illustrated embodiment. This period, during which only the very small D.C. current from the D.C. supply 28 passes through the rectifier 10, is indicated in FIG. 2 between the 59th and 60th pulses. The interrupt period is used in the subject method to remeasure the voltage across the rectifier 10 to provide an indication of the rectifier 10 operating characteristics at a low current level when the rectifier 10 junction is at an increased temperature due to its being heated by the current pulses. This voltage, $V_3$, is measured by the voltmeter 16 in response to a positive pulse from the MCU 26 during the interrupt period as indicated in FIG. 2. The voltage $V_3$ may be compared with $V_1$ to predict the maximum temperature to be expected at the rectifier 10 junction, as will be subsequently explained.

At the completion of the interrupt period the pulse supply 32 is again connected in series with the rectifier 10 so as to apply a 60th current pulse to the rectifier 10. When the 60th current pulse is at a maximum the MCU 26 applies a positive pulse to the voltmeter 16, causing it to remeasure the forward voltage across the rectifier 10 to provide an indication of the rectifier 10 operating characteristics at a high current level when the rectifier 10 junction is at the increased temperature. This measurement, $V_4$, is made as shown in FIG. 2. As will be later explained, comparison of $V_4$ with $V_2$ will provide an indication of the construction quality of the rectifier 10. At the completion of the 60th pulse the MCU 26 applies a negative pulse to the switches 30 and 34 to disconnect the supplies 28 and 32 from the rectifier 10 and a positive pulse to the switch 38 so as to connect the D.C. supply 36 to the rectifier 10.

When the switch 38 is closed the D.C. supply 36 supplies the rectifier 10 with a reverse bias voltage and produces a reverse leakage current $I_r$ through the rectifier 10. Approximately 50 microseconds after the D.C. supply 36 is applied to the rectifier 10, the MCU 26 applies a positive pulse to the voltmeter 24, causing the voltmeter 24 to measure the voltage across the resistor 22, which voltage is proportional to $I_r$, as indicated in FIG. 2. From this measurement of $I_r$, it is possible to predict whether the rectifier 10 will undergo thermal runaway because the leakage current $I_r$ is directly proportional to the probability of the rectifier 10 undergoing thermal runaway under a given set of conditions. After the voltmeter 24 has measured the voltage across the resistor 22 the MCU 26 turns off the switch 38 with a negative pulse so as to complete the test.

It should be noted at this point that $V_3$, $V_4$, and $I_r$ must be measured before the heat present at the rectifier 10 junction is dissipated to the rectifier 10 case as these measurements are all to be made when the rectifier 10 junction is at the increased temperature, even though the temperature of the rectifier 10 case remains at nearly room temperature during the entire test. It is for this reason that an interrupt period is provided during which $V_3$ is measured as measuring both $V_3$ and $I_r$ after the 60th current pulse is introduced to the rectifier 10 would probably permit at least a partial dissipation of heat energy from the rectifier 10 junction before the measurement of $I_r$ is completed. Since the temperature of the rectifier 10 junction is nearly the same before the 60th current pulse as it is immediately after the 60th current pulse, it may be assumed that $V_3$, $V_4$, and $I_r$ are measured when the rectifier 10 junction is at the same increased temperature. Of course, if the apparatus used in practicing the subject method is capable of operating extremely fast the interrupt period may be omitted and both $V_3$ and $I_r$ may be measured after the pulse supply 32 is permanently removed from the rectifier 10. This variation of the subject method would be especially useful where the pulse supply 32 heats the rectifier 10 junction with a single, constant level current pulse.

While the various voltage measurements are being made by the voltmeter 16, the voltmeter 16 automatically makes the comparisons previously mentioned by performing three subtractions and provides indications of the remainders from these subtractions, the remainders being indicative of some of the rectifier 10 characteristics. The voltmeter subtracts $V_1$ from $V_2$, $V_1$ from $V_3$, and $V_2$ from $V_4$.

Subtracting $V_1$ from $V_2$ provides an indication of the rectifier 10 forward voltage characteristic slope illustrated in FIG. 3. For example, if the rectifier 10 forward voltage characteristic is as shown by the solid line in FIG. 3, 10 milliamps of current through the rectifier 10 would result in measuring $V_1$ as 0.6 volt, indicated by point A in FIG. 3, and 100 amps through the rectifier 10 would result in $V_2$ being 1.5 volts, indicated by point B in FIG. 3. The difference between $V_2$ and $V_1$ of 0.9 volt would be representative of the curve shown as a solid line. However, if the rectifier 10 had a forward voltage characteristic as indicated by the dashed line in FIG. 3, $V_2$ would be 1.4 volt and the difference between $V_1$ and $V_2$ would be 0.8 volt, which would be representative of the curve shown as a dashed line. It is therefore possible to use the voltage difference between $V_1$ and $V_2$ as an indication of the rectifier 10 forward voltage characteristic slope.

Subtracting $V_1$ from $V_3$ provides an indication of the maximum temperature to be expected at the rectifier 10 junction. Since both of these measurements are made while the rectifier 10 current is at the very low level established by the D.C. supply 28, the resistive losses in the rectifier 10 are at a minimum. It may therefore be assumed that the voltage across the rectifier 10 terminals at low current levels is the same as the voltage across the rectifier 10 junction itself. The difference between $V_1$ and $V_3$ may therefore be used as an indication of the temperature attained by the rectifier 10 junction as a result of the predetermined current being supplied to the rectifier 10 for the predetermined time by the pulse source 32 and may thus be used to predict the maximum temperature to be expected at the rectifier 10 junction.

Subtracting $V_2$ from $V_4$ provides an indication of the rectifier 10 construction quality. The rectifier 10 construction quality is affected by the purity of the materials used and the quality of solder joints between the materials. The rectifier 10 construction quality is thus a function of the rectifier 10 internal resistance. When high current levels are experienced by the rectifier 10, as when $V_2$ and $V_4$ are measured, the voltage across the rectifier 10 terminals is the sum of the voltage across the rectifier 10 junction and the voltage drop due to the rectifier 10 internal resistance. Since the voltage across the rectifier 10 junction remains at a relatively low and nearly constant level at all current levels, $V_2$ and $V_4$ are primarily comprised of voltage drops due to the rectifier 10 internal resistance. The difference between $V_2$ and $V_4$ is therefore proportional to a change in the rectifier 10 resistive losses due to the predetermined current supplied to the rectifier 10 for the predetermined time and may thus be used as an indication of the quality of the rectifier 10 construction.

When the testing of the rectifier 10 is complete an observer reads the indications presented by the voltmeters 16 and 24, after which they are reset by negative pulses from the MCU 26. These resetting pulses from the MCU 26 may be either timed to occur automatically after providing an opportunity for reading the output from the voltmeters 16 and 24 or may be produced in response to a manual control on the MCU 26. After the voltmeters 16 and 24 are reset the circuit 12 is ready to test another rectifier.

While the foregoing description has been keyed to the illustrated embodiment it is to be understood that this invention is to be limited only by the scope of the following claims:

What is claimed is:

1. A method of testing rectifiers comprising the steps of measuring at least one of the parameters of a rectifier so as to provide an indication of the rectifier operating characteristics when the rectifier junction is at room temperature, heating substantially only the rectifier junction by supplying the rectifier junction with a predetermined current for a predetermined time insufficient to permit significant heat dissipation from the rectifier junction so as to increase the rectifier junction temperature from room temperature to an increased temperature, remeasuring at least one of the parameters of the rectifier so as to provide an indication of the effect heating the rectifier junction has on the parameters measured, and comparing the measured parameters so as to be able to predict the rectifier characteristics.

2. A method of testing rectifiers comprising the steps of measuring the forward voltage across a rectifier when a certain current is passed through the rectifier so as to provide an indication of the rectifier operating characteristics when the rectifier junction is at room temperature, heating substantially only the rectifier junction by supplying the rectifier junction with a predetermined current for a predetermined time insufficient to permit significant heat dissipation from the rectifier junction so as to increase the rectifier junction temperature from room temperature to an increased temperature, remeasuring the forward voltage across the rectifier when only the certain current is passed through the rectifier and the rectifier junction is at the increased temperature so as to provide an indication of the rectifier operating characteristics when the rectifier junction is at the increased temperature, and comparing the voltages measured across the rectifier for evaluating the rectifier reliability and for predicting the operating temperature of the rectifier junction.

3. A method of testing rectifiers comprising the steps of heating substantially only the rectifier junction by supplying the rectifier junction with a predetermined current for a predetermined time insufficient to permit significant heat dissipation from the rectifier junction so as to increase the rectifier junction temperature from room temperature to an increased temperature, supplying the rectifier with a reverse bias voltage when the rectifier junction is at the increased temperature so as to cause a reverse leakage current through the rectifier, and measuring the leakage current through the rectifier so as to be able to predict whether the rectifier will undergo thermal runaway during operation.

4. A method of testing rectifiers comprising the steps of heating substantially only the rectifier junction by supplying the rectifier junction with a predetermined current for a predetermined time insufficient to permit significant heat dissipation from the rectifier junction so as to increase the rectifier junction temperature from room temperature to an increased temperature, the predetermined current including a series of current pulses, measuring the forward voltage across the rectifier when one of the first in the series of current pulses is at a maximum and the rectifier junction is at room temperature so as to provide an indication of the rectifier operating characteristics at a high current level when the rectifier junction is at room temperature, remeasuring the forward voltage across the rectifier when one of the last in the series of current pulses is at a maximum and the rectifier junction is at the increased temperature so as to provide an indication of the rectifier operating characteristics at a high current level when the rectifier junction is at the increased temperature, and comparing the voltages measured across the rectifier for evaluating the construction quality of the rectifier.

5. A method of testing rectifiers comprising the steps of measuring the forward voltage across a rectifier when a certain current is passed through the rectifier so as to provide an indication of the rectifier operating characteristics at a low current level when the rectifier junction is at room temperature, heating substantially only the rectifier junction by supplying the rectifier junction with a predetermined current for a predetermined time insufficient to permit significant heat dissipation from the rectifier junction so as to increase the rectifier junction temperature from room temperature to an increased temperature, the predetermined current including a series of current pulses having a magnitude several times greater than the magnitude of the certain current, remeasuring the forward voltage across the rectifier when one of the first in the series of current pulses is at a maximum so as to provide an indication of the rectifier operating characteristics at a high current level when the rectifier junction is at room temperature, remeasuring the forward voltage across the rectifier when only the certain current is passed through the rectifier and the rectifier junction is at the increased temperature so as to provide an indication of the rectifier operating characteristics at a low current level when the rectifier junction is at the increased temperature, comparing the forward voltages measured across the rectifier at a low current level for evaluating the rectifier reliability and for predicting the rectifier operating temperature, remeasuring the forward voltage across the rectifier when one of the last in the series of current pulses is at a maximum and the rectifier junction is at the increased temperature so as to provide an indication of the rectifier operating characteristics at a high current level when the rectifier junction is at the increased temperature, and comparing the forward voltages measured across the rectifier at a high current level for evaluating the construction quality of the rectifier.

6. A method of testing rectifiers comprising the steps of measuring the forward voltage across a rectifier when a certain current is passed through the rectifier so as to provide an indication of the rectifier operating characteristics at a low current level when the rectifier junction is at room temperature, heating substantially only the rectifier junction by supplying the rectifier junction with a predetermined current for a predetermined time insufficient to permit significant heat dissipation from the rectifier junction so as to increase the rectifier junction temperature from room temperature to an increased temperature, the predetermined current including a series of current pulses having a magnitude several times greater than the magnitude of the certain current, remeasuring the forward voltage across the rectifier when one of the first in the series of current pulses is at a maximum so as to provide an indication of the rectifier operating characteristics at a high current level when the rectifier junction is at room temperature, comparing the measured voltages so as to provide an indication of the rectifier forward voltage characteristic slope, remeasuring the forward voltage across the rectifier when only the certain current is passed through the rectifier and the rectifier junction is at the increased temperature so as to provide an indication of the rectifier operating characteristics at a low current level when the rectifier junction is at the increased temperature, and comparing the forward voltages measured across the rectifier at a low current level for evaluating the rectifier reliability and for predicting the rectifier operating temperature.

7. A method of testing rectifiers comprising the steps of measuring the forward voltage across a rectifier when a certain current is passed through the rectifier so as to provide an indication of the rectifier operating characteristics at a low current level when the rectifier junction is at room temperature, heating substantially only the rectifier junction by supplying the rectifier junction with a predetermined current for a predetermined time insufficient to permit significant heat dissipation from the rectifier junction so as to increase the rectifier junction temperature from room temperature to an increased temperature, the predetermined current including a series of current pulses having a magnitude several times greater than the magnitude of the certain current, remeasuring the forward voltage across the rectifier when one of the first in the series of current pulses is at a maximum so as to provide an indication of the rectifier operating characteristics at a high current level when the rectifier junction is at room temperature, comparing the measured voltages so as to provide an indication of the rectifier forward voltage characteristic slope, remeasuring the forward voltage across the rectifier when one of the last in the series of current pulses is at a maximum and the rectifier junction is at the increased temperature so as to provide an indication of the rectifier operating characteristics at a high current level when the rectifier junction is at the increased temperature, comparing the forward voltages measured across the rectifier at a high current level for evaluating the construction quality of the rectifier.

8. A method of testing rectifiers comprising the steps of measuring the forward voltage across a rectifier when a certain current is passed through the rectifier so as to provide an indication of the rectifier operating characteristics at a low current level when the rectifier junction is at room temperature, heating substantially only the rectifier junction by supplying the rectifier junction with a predetermined current for a predetermined time insufficient to permit significant heat dissipation from the rectifier junction so as to increase the rectifier junction temperature from room temperature to an increased temperature, the predetermined current including a series of current pulses having a magnitude several times greater than the magnitude of the certain current, remeasuring the forward voltage across the rectifier when only the certain current is passed through the rectifier and the rectifier junction is at the increased temperature so as to provide an indication of the rectifier operating characteristics at a low current level when the rectifier junction is at the increased temperature, comparing the forward voltages measured across the rectifier at a low current level for evaluating the rectifier reliability and for predicting the rectifier operating temperature, supplying the rectifier with a reverse bias voltage when the rectifier junction is at the increased temperature so as to cause a reverse leakage current through the rectifier, and measuring the reverse leakage current through the rectifier so as to be able to predict whether the rectifier will undergo thermal runaway.

9. A method of testing rectifiers comprising the steps of measuring the forward voltage across a rectifier when a certain current is passed through the rectifier so as to provide an indication of the rectifier operating characteristics at a low current level when the rectifier junction is at room temperature, heating substantially only the rectifier junction by supplying the rectifier junction with a predetermined current for a predetermined time insufficient to permit significant heat dissipation from the rectifier junction so as to increase the rectifier junction temperature from room temperature to an increased temperature, the predetermined current including a series of current pulses having a magnitude several times greater than the magnitude of the certain current, remeasuring the forward voltage across the rectifier when one of the first in the series of current pulses is at a maximum so as to provide an indication of the rectifier operating characteristics at a high current level when the rectifier junction is at room temperature, comparing the measured voltages so as to provide an indication of the rectifier forward voltage characteristic slope, remeasuring the forward voltage across the rectifier when only the certain current is passed through the rectifier and the rectifier junction is at the increased temperature so as to provide an indication of the rectifier operating characteristics at a low current level when the rectifier junction is at the increased temperature, comparing the forward voltages measured across the rectifier at a low current level for evaluating the rectifier reliability and for predicting the rectifier operating temperature, remeasuring the forward voltage across the rectifier when one of the last in the series of current pulses is at a maximum and the rectifier junction is at the increased temperature so as to provide an indication of the rectifier operating characteristics at a high current level when the rectifier junction is at the increased temperature, and comparing the forward voltages measured across the rectifier at a high current level for evaluating the construction quality of the rectifier.

10. A method of testing rectifiers comprising the steps of measuring the forward voltage across a rectifier when a certain current is passed through the rectifier so as to provide an indication of the rectifier operating characteristics at a low current level when the rectifier junction is at room temperature, heating substantially only the rectifier junction by supplying the rectifier junction with a predetermined current for a predetermined time insufficient to permit significant heat dissipation from the rectifier junction so as to provide an indication of the rectifier operating characteristics at a high current level when the rectifier junction is at room temperature, comparing the measured voltages so as to provide an indication of the rectifier forward voltage characteristic slope, remeasuring the forward voltage across the rectifier when only the certain current is passed through the rectifier and the rectifier junction is at the increased temperature so as to provide an indication of the rectifier operating characteristics at a low current level when the rectifier junction is at the increased temperature, comparing the forward voltages measured across the rectifier at a low current level for evaluating the rectifier reliability and for predicting the rectifier operating temperature, remeasuring the forward voltage across the rectifier when one of the last in the series of current pulses is at a maximum and the rectifier junction is at the increased temperature so as to provide an indication of the rectifier operating characteristics at a high current level when the rectifier junction is at the increased temperature, comparing the forward voltages measured across the rectifier at a high current level for evaluating the construction quality of the rectifier, supplying the rectifier with a reverse bias voltage when the rectifier junction is at the increased temperature so as to cause a reverse leakage current through the rectifier, and measuring the reverse leakage current through the rectifier so as to be able to predict whether the rectifier will undergo thermal runaway.

* * * * *

PO-1050
(5/69)

UNITED STATES PATENT OFFICE
CERTIFICATE OF CORRECTION

Patent No. __3,659,199__    Dated __April 25, 1972__

Inventor(s) __Charles J. Knutson__

It is certified that error appears in the above-identified patent and that said Letters Patent are hereby corrected as shown below:

Column 9, line 20, after "so as to" insert -- increase the rectifier junction temperature from room temperature to an increased temperature, the predetermined current including a series of current pulses having a magnitude several times greater than the magnitude of the certain current, remeasuring the forward voltage across the rectifier when one of the first in the series of current pulses is at a maximum so as to --.

Signed and sealed this 1st day of August 1972.

(SEAL)
Attest:

EDWARD M. FLETCHER, JR.
Attesting Officer

ROBERT GOTTSCHALK
Commissioner of Patents